US012663329B2

(12) United States Patent
Oexl et al.

(10) Patent No.: US 12,663,329 B2
(45) Date of Patent: Jun. 23, 2026

(54) METHOD AND SYSTEM FOR ESTIMATION OF MASS AND A CENTER OF GRAVITY OF A TRUCK-TRAILER

(71) Applicant: Torc Robotics, Inc., Blacksburg, VA (US)

(72) Inventors: Stefan Oexl, Stuttgart (DE); Roman Keller, Denkendorf (DE); Sebastian Beckmann, Stuttgart (DE)

(73) Assignee: TORC Robotics, Inc., Blacksburg, VA (US)

( * ) Notice: Subject to any disclaimer, the term of this patent is extended or adjusted under 35 U.S.C. 154(b) by 24 days.

(21) Appl. No.: 18/663,441

(22) Filed: May 14, 2024

(65) Prior Publication Data

US 2025/0354885 A1     Nov. 20, 2025

(51) Int. Cl.
G01M 1/12          (2006.01)
G06T 7/66          (2017.01)

(52) U.S. Cl.
CPC ............... G01M 1/122 (2013.01); G06T 7/66 (2017.01); G06T 2207/30252 (2013.01)

(58) Field of Classification Search
CPC . G01M 1/122; G06T 7/66; G06T 2207/30252
USPC ........................................ 701/124
See application file for complete search history.

(56) References Cited

U.S. PATENT DOCUMENTS

| | | | |
|---|---|---|---|
| 7,676,307 B2 | 3/2010 | Schmitt | |
| 8,966,962 B2 * | 3/2015 | Kamada | G01G 19/02 |
| | | | 701/124 |
| 9,358,846 B2 | 6/2016 | Singh | |
| 11,199,469 B2 * | 12/2021 | Kusaka | G01G 19/022 |
| 11,511,732 B2 | 11/2022 | Shur | |
| 2010/0076673 A1 * | 3/2010 | Saloka | B60D 1/248 |
| | | | 701/124 |
| 2018/0045556 A1 * | 2/2018 | Imagawa | G06V 20/588 |
| 2020/0172087 A1 * | 6/2020 | Shur | E02F 9/2025 |
| 2020/0384823 A1 | 12/2020 | Shukla | |
| 2021/0383318 A1 * | 12/2021 | Patnaik | G06Q 10/0832 |
| 2023/0237680 A1 | 7/2023 | Francois | |
| 2023/0237809 A1 | 7/2023 | Ishizaki | |
| 2023/0410528 A1 * | 12/2023 | Weston | G06V 20/56 |
| 2025/0108671 A1 | 4/2025 | Bill et al. | |

FOREIGN PATENT DOCUMENTS

EP          2539216 A2      1/2013

* cited by examiner

*Primary Examiner* — Tarek Elarabi
*Assistant Examiner* — Preston Jay Miller
(74) *Attorney, Agent, or Firm* — Armstrong Teasdale LLP

(57)          ABSTRACT

A system includes at least one processor configured to: (i) determining a first distance between a center point of a wheel of an unloaded vehicle and a chassis spring of the vehicle based on first sensor data of the first set of plurality of image sensors; (ii) determining a second distance between the center point and the chassis spring for the loaded vehicle based on second sensor data of the first set of plurality of image sensors; (iii) based upon a difference between the first distance and the second distance, and characteristics of the chassis spring, determining a load at each wheel for determining a total mass of the vehicle and a first coordinates of a center of gravity of the vehicle along a longitudinal axis and a lateral axis with respect to a front axle of the vehicle.

20 Claims, 12 Drawing Sheets

500a top view

500b

500c

X

600

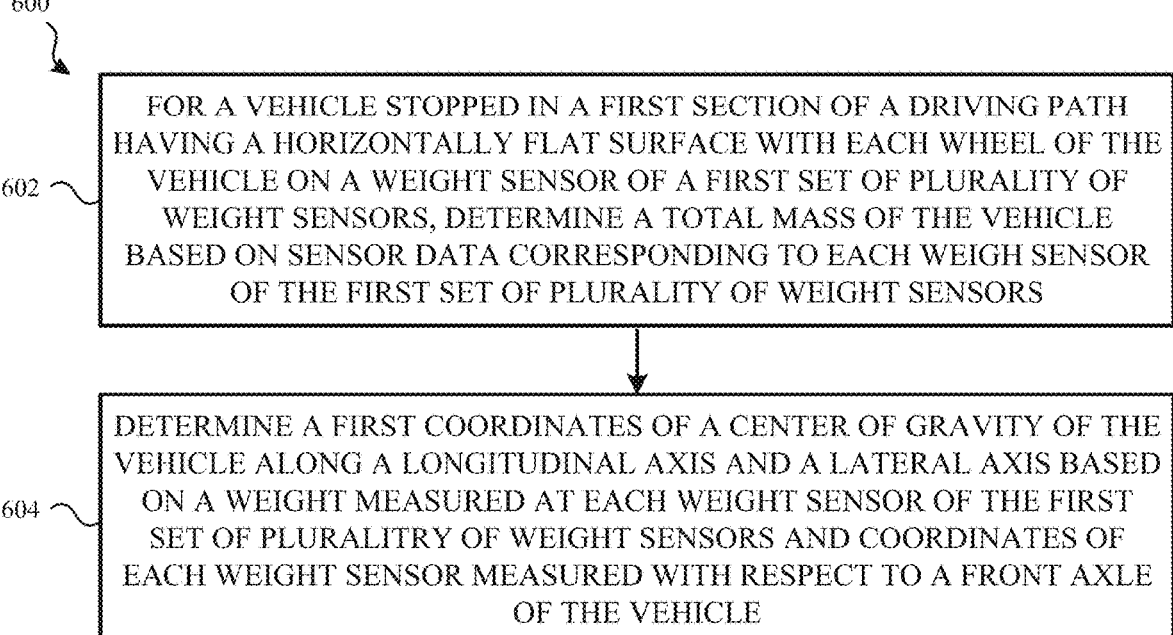

602

FOR A VEHICLE STOPPED IN A FIRST SECTION OF A DRIVING PATH HAVING A HORIZONTALLY FLAT SURFACE WITH EACH WHEEL OF THE VEHICLE ON A WEIGHT SENSOR OF A FIRST SET OF PLURALITY OF WEIGHT SENSORS, DETERMINE A TOTAL MASS OF THE VEHICLE BASED ON SENSOR DATA CORRESPONDING TO EACH WEIGH SENSOR OF THE FIRST SET OF PLURALITY OF WEIGHT SENSORS

604

DETERMINE A FIRST COORDINATES OF A CENTER OF GRAVITY OF THE VEHICLE ALONG A LONGITUDINAL AXIS AND A LATERAL AXIS BASED ON A WEIGHT MEASURED AT EACH WEIGHT SENSOR OF THE FIRST SET OF PLURALITRY OF WEIGHT SENSORS AND COORDINATES OF EACH WEIGHT SENSOR MEASURED WITH RESPECT TO A FRONT AXLE OF THE VEHICLE

FIG. 6

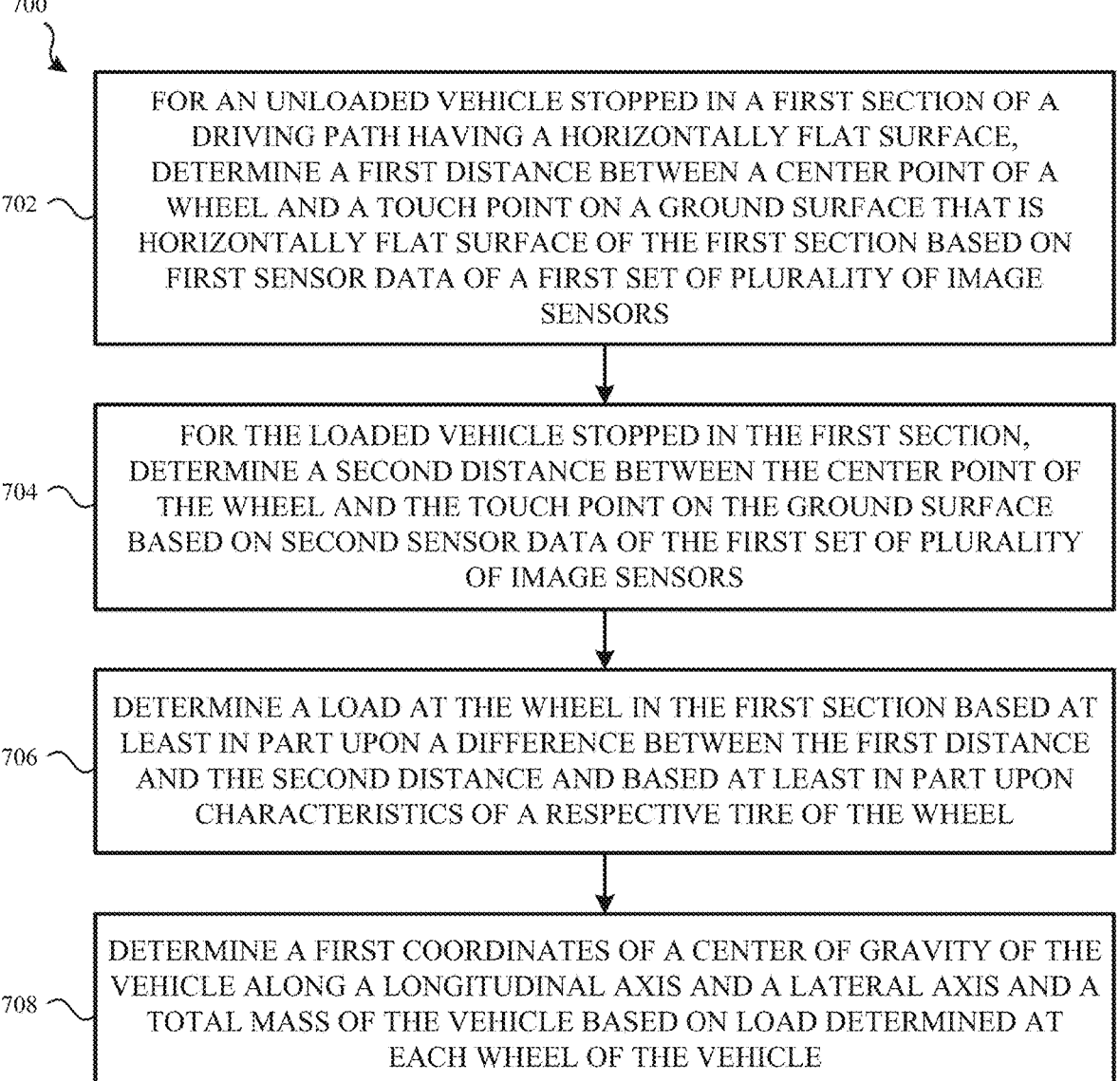

700

702 FOR AN UNLOADED VEHICLE STOPPED IN A FIRST SECTION OF A DRIVING PATH HAVING A HORIZONTALLY FLAT SURFACE, DETERMINE A FIRST DISTANCE BETWEEN A CENTER POINT OF A WHEEL AND A TOUCH POINT ON A GROUND SURFACE THAT IS HORIZONTALLY FLAT SURFACE OF THE FIRST SECTION BASED ON FIRST SENSOR DATA OF A FIRST SET OF PLURALITY OF IMAGE SENSORS

704 FOR THE LOADED VEHICLE STOPPED IN THE FIRST SECTION, DETERMINE A SECOND DISTANCE BETWEEN THE CENTER POINT OF THE WHEEL AND THE TOUCH POINT ON THE GROUND SURFACE BASED ON SECOND SENSOR DATA OF THE FIRST SET OF PLURALITY OF IMAGE SENSORS

706 DETERMINE A LOAD AT THE WHEEL IN THE FIRST SECTION BASED AT LEAST IN PART UPON A DIFFERENCE BETWEEN THE FIRST DISTANCE AND THE SECOND DISTANCE AND BASED AT LEAST IN PART UPON CHARACTERISTICS OF A RESPECTIVE TIRE OF THE WHEEL

708 DETERMINE A FIRST COORDINATES OF A CENTER OF GRAVITY OF THE VEHICLE ALONG A LONGITUDINAL AXIS AND A LATERAL AXIS AND A TOTAL MASS OF THE VEHICLE BASED ON LOAD DETERMINED AT EACH WHEEL OF THE VEHICLE

FIG. 7

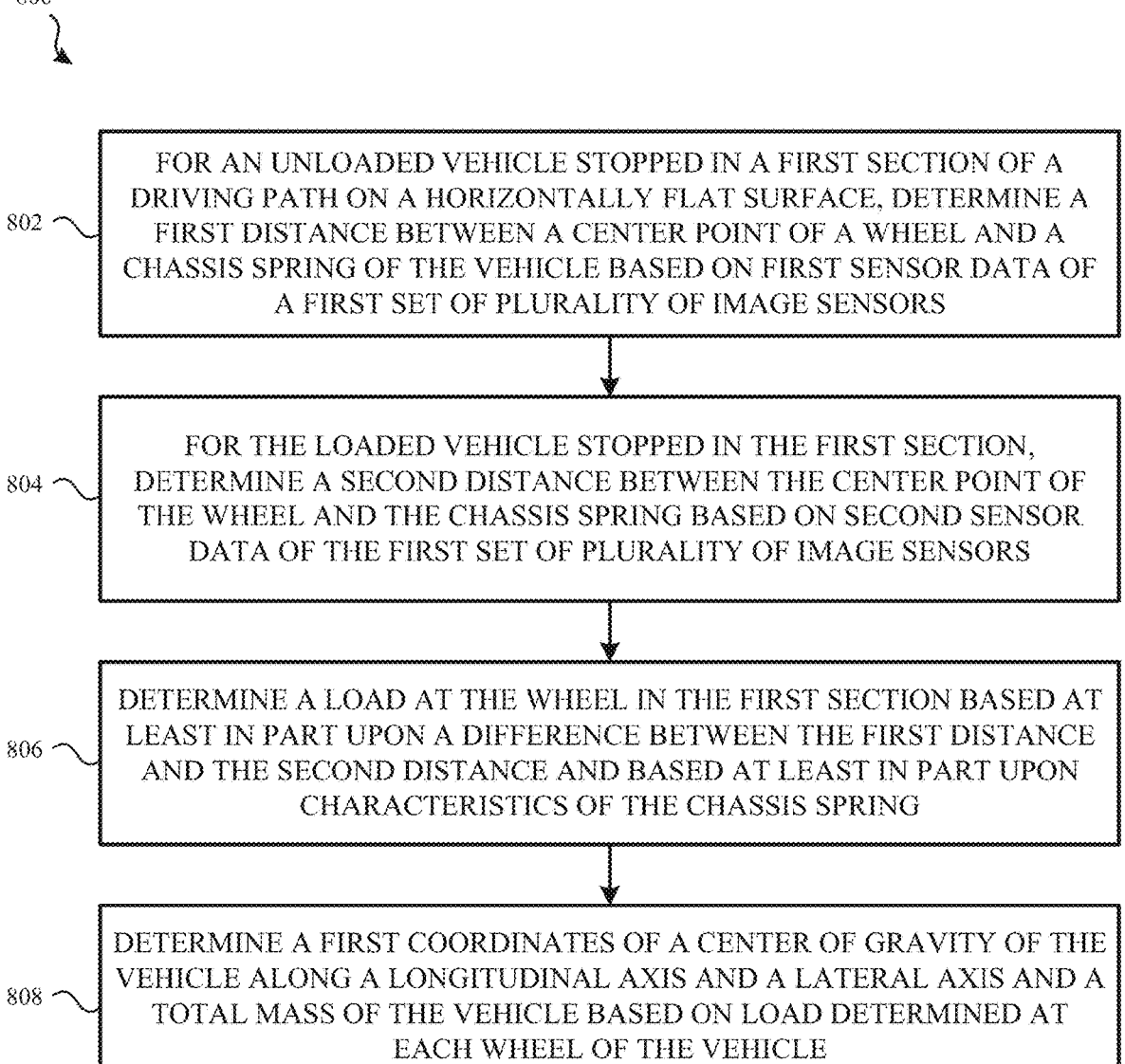

800

802 — FOR AN UNLOADED VEHICLE STOPPED IN A FIRST SECTION OF A DRIVING PATH ON A HORIZONTALLY FLAT SURFACE, DETERMINE A FIRST DISTANCE BETWEEN A CENTER POINT OF A WHEEL AND A CHASSIS SPRING OF THE VEHICLE BASED ON FIRST SENSOR DATA OF A FIRST SET OF PLURALITY OF IMAGE SENSORS

804 — FOR THE LOADED VEHICLE STOPPED IN THE FIRST SECTION, DETERMINE A SECOND DISTANCE BETWEEN THE CENTER POINT OF THE WHEEL AND THE CHASSIS SPRING BASED ON SECOND SENSOR DATA OF THE FIRST SET OF PLURALITY OF IMAGE SENSORS

806 — DETERMINE A LOAD AT THE WHEEL IN THE FIRST SECTION BASED AT LEAST IN PART UPON A DIFFERENCE BETWEEN THE FIRST DISTANCE AND THE SECOND DISTANCE AND BASED AT LEAST IN PART UPON CHARACTERISTICS OF THE CHASSIS SPRING

808 — DETERMINE A FIRST COORDINATES OF A CENTER OF GRAVITY OF THE VEHICLE ALONG A LONGITUDINAL AXIS AND A LATERAL AXIS AND A TOTAL MASS OF THE VEHICLE BASED ON LOAD DETERMINED AT EACH WHEEL OF THE VEHICLE

FIG. 8

METHOD AND SYSTEM FOR ESTIMATION OF MASS AND A CENTER OF GRAVITY OF A TRUCK-TRAILER

TECHNICAL FIELD

The field of the disclosure relates to vehicle safety and regulatory compliance and, in particular, to a method and a system for estimating mass and a center of gravity (COG) of a truck coupled with a loaded trailer.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Behaviors and planning technologies to plan maneuvers need to know a total mass of a tractor of a truck and a trailer loaded with goods that is coupled to the tractor of truck. Additionally, behaviors and planning technologies also need to know a location of a center of gravity of the tractor combined with the trailer to influence the dynamic behavior of the truck on the road. Driving behavior, for example, maximum acceleration or maximum deceleration in longitudinal and lateral distance, needs to be adjusted according to the values for the total mass and the location of the center of gravity for safety of the truck. Because the truck's weight may be lower compared to the potential load of goods in the trailer in comparison with a regular car loaded with goods, the total mass, and the location of the center of gravity can vary significantly and affect maneuvering of the truck. The driver of a vehicle usually assesses the mass and the center of gravity by visual inspection of the shipped goods and based on his experience and reactions of the vehicle to his driving commands. However, autonomous vehicles often omit the driver.

Accordingly, there exists a need for a system and a method to accurately determine a total mass and a center of gravity of an autonomous truck with a trailer that is loaded with goods for safe maneuvering of the truck.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system including a driving path including a first section, a first set of plurality of image sensors positioned in the first section, and at least one processor configured to execute instructions stored in at least one memory is disclosed. The first section includes a horizontally flat surface. The at least one processor is configured to perform operations including (i) for each wheel of a plurality of wheels of a vehicle while the vehicle is stopped in the first section on the horizontally flat surface and not loaded, determining a first distance between a center point of a wheel and a chassis spring of the vehicle based on first sensor data of the first set of plurality of image sensors; (ii) for each wheel of the plurality of wheels of the vehicle while the vehicle is stopped in the first section on the horizontally flat surface and loaded, determining a second distance between the center point and the chassis spring based on second sensor data of the first set of plurality of image sensors; (iii) based at least in part upon a difference between the first distance and the second distance, and based at least in part upon characteristics of the chassis spring, determining a load at each wheel in the first section; and (iv) based upon the load at each wheel in the first section, determining a total mass of the vehicle and a first coordinates of a center of gravity of the vehicle along a longitudinal axis and a lateral axis with respect to a front axle of the vehicle.

In another aspect, a computer-implemented method is disclosed. The method includes (i) for each wheel of a plurality of wheels of a vehicle while the vehicle is stopped in a first section of a driving path on a horizontally flat surface of the first section and not loaded, determining a first distance between a center point of a wheel and a chassis spring of the vehicle based on first sensor data of a first set of plurality of image sensors positioned in the first section; (ii) for each wheel of the plurality of wheels of the vehicle while the vehicle is stopped in the first section on the horizontally flat surface and loaded, determining a second distance between the center point and the chassis spring based on second sensor data of the first set of plurality of image sensors; (iii) based at least in part upon a difference between the first distance and the second distance, and based at least in part upon characteristics of the chassis spring, determining a load at each wheel in the first section; and (iv) based upon the load at each wheel in the first section, determining a total mass of the vehicle and a first coordinates of a center of gravity of the vehicle along a longitudinal axis and a lateral axis with respect to a front axle of the vehicle.

In yet another aspect, at least one non-transitory computer-readable medium (CRM) storing instructions is disclosed. The instruction, when executed by at least one processor of a system, cause the at least one processor to perform operations including (i) for each wheel of a plurality of wheels of a vehicle while the vehicle is stopped in a first section of a driving path on a horizontally flat surface of the first section and not loaded, determining a first distance between a center point of a wheel and a chassis spring of the vehicle based on first sensor data of a first set of plurality of image sensors positioned in the first section; (ii) for each wheel of the plurality of wheels of the vehicle while the vehicle is stopped in the first section on the horizontally flat surface and loaded, determining a second distance between the center point and the chassis spring based on second sensor data of the first set of plurality of image sensors; (iii) based at least in part upon a difference between the first distance and the second distance, and based at least in part upon characteristics of the chassis spring, determining a load at each wheel in the first section; and (iv) based upon the load at each wheel in the first section, determining a total mass of the vehicle and a first coordinates of a center of gravity of the vehicle along a longitudinal axis and a lateral axis with respect to a front axle of the vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 6 illustrates a flow-chart of method operations performed by a system using multiple weight sensors.

FIG. 7 illustrates a flow-chart of method operations performed by a system using multiple image sensors.

FIG. 8 illustrates another flow-chart of method operations performed by a system using multiple image sensors.

Figure 1:
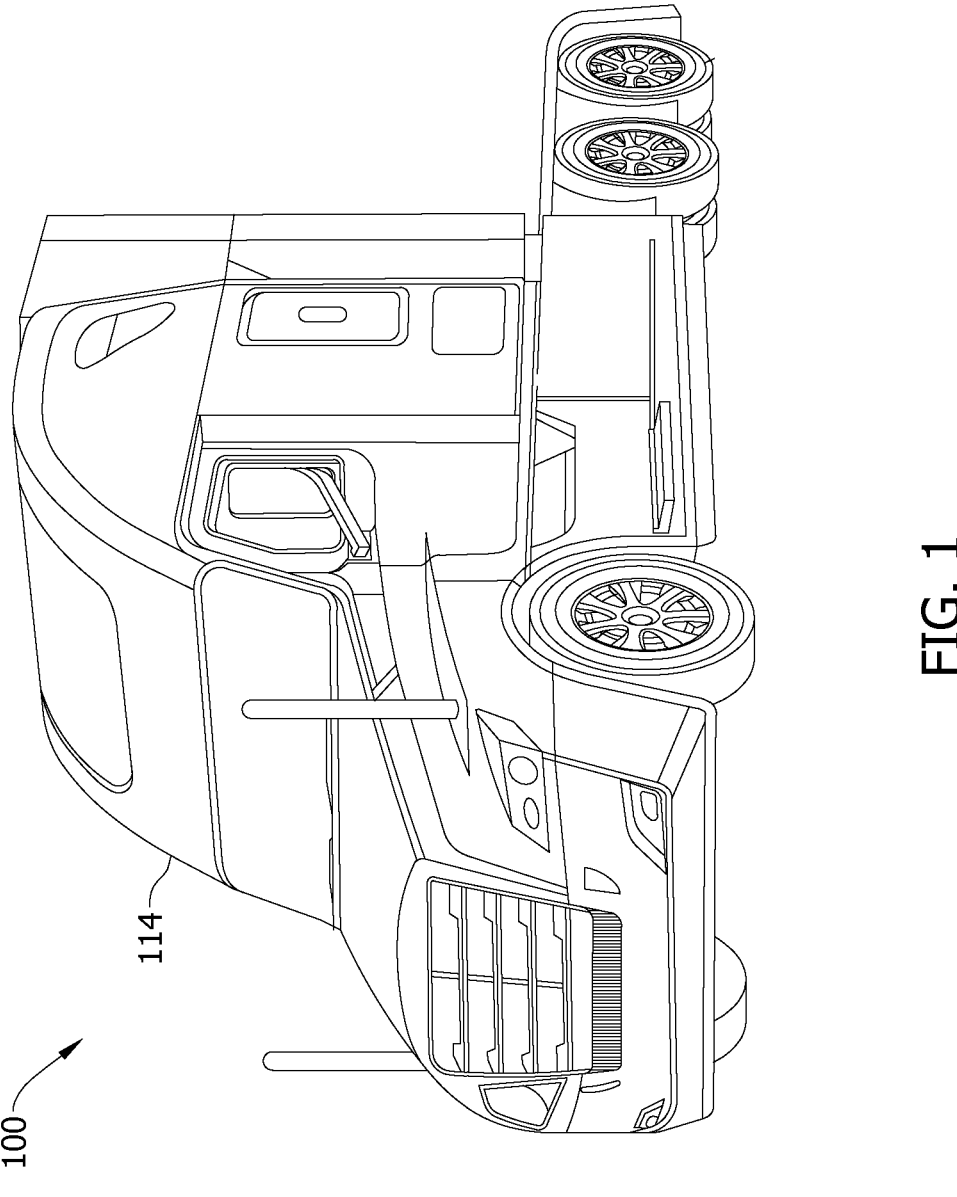
FIG. 1 is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Various embodiments described herein correspond with systems and methods to accurately determine a total mass and a center of gravity of an autonomous truck with a trailer that is loaded with goods for safe maneuvering of the autonomous truck. The embodiments described herein with reference to an autonomous truck may also be applicable to a semi-autonomous or non-autonomous truck. The total mass and the center of gravity of the autonomous truck are determined at a hub, where the trailer generally gets loaded or unloaded, before the truck leaves the hub to a destination of the goods in public traffic. In the embodiments, the total mass and the center of gravity are determined using a plurality of image sensors, and based on details or characteristics of mass and center of gravity of a truck with an empty trailer, tire stiffness, chassis suspension stiffness, etc.

Various embodiments in the present disclosure are described with reference to FIGS. 1-8 below.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
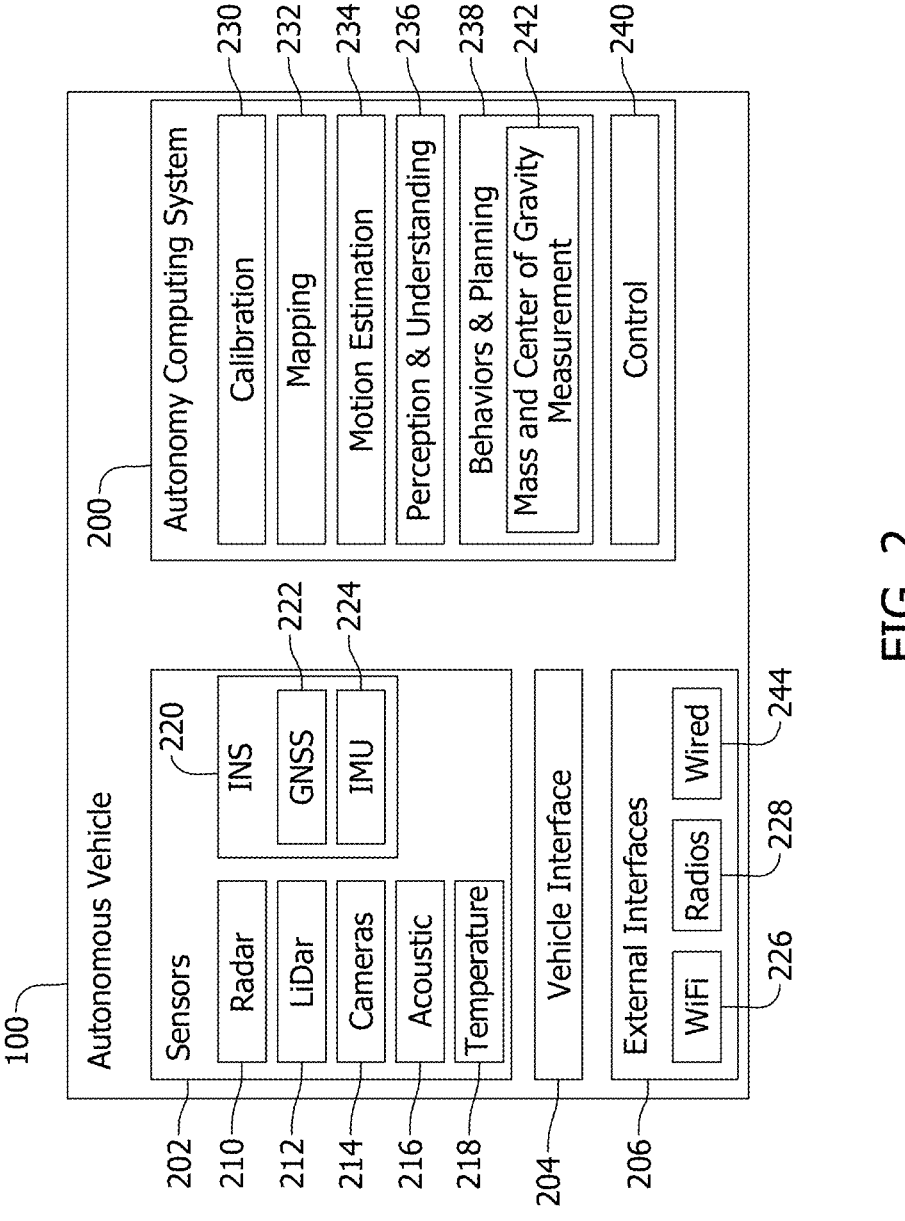
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS)

220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a mass and center of gravity measurement module 242. The mass and center of gravity measurement module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The mass and center of gravity measurement module 242 may perform one or more tasks including, but not limited to, receiving data corresponding to the total mass and the center of gravity of autonomous vehicle 100 with a trailer loaded with goods. Data corresponding to the total mass and the center of gravity may be based on measurements performed at a hub, while autonomous vehicle 100, is in a parked position, using multiple image sensors (or cameras) mounted or positioned at the hub. Additionally, or alternatively, data corresponding to the total mass and the center of gravity may be based on measurements performed at the hub using multiple weight sensors (e.g., strain gage-based sensors) positioned at the hub to measure force or weight applied at multiple measurement points (e.g., at each wheel of autonomous vehicle 100 and a connected trailer).

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
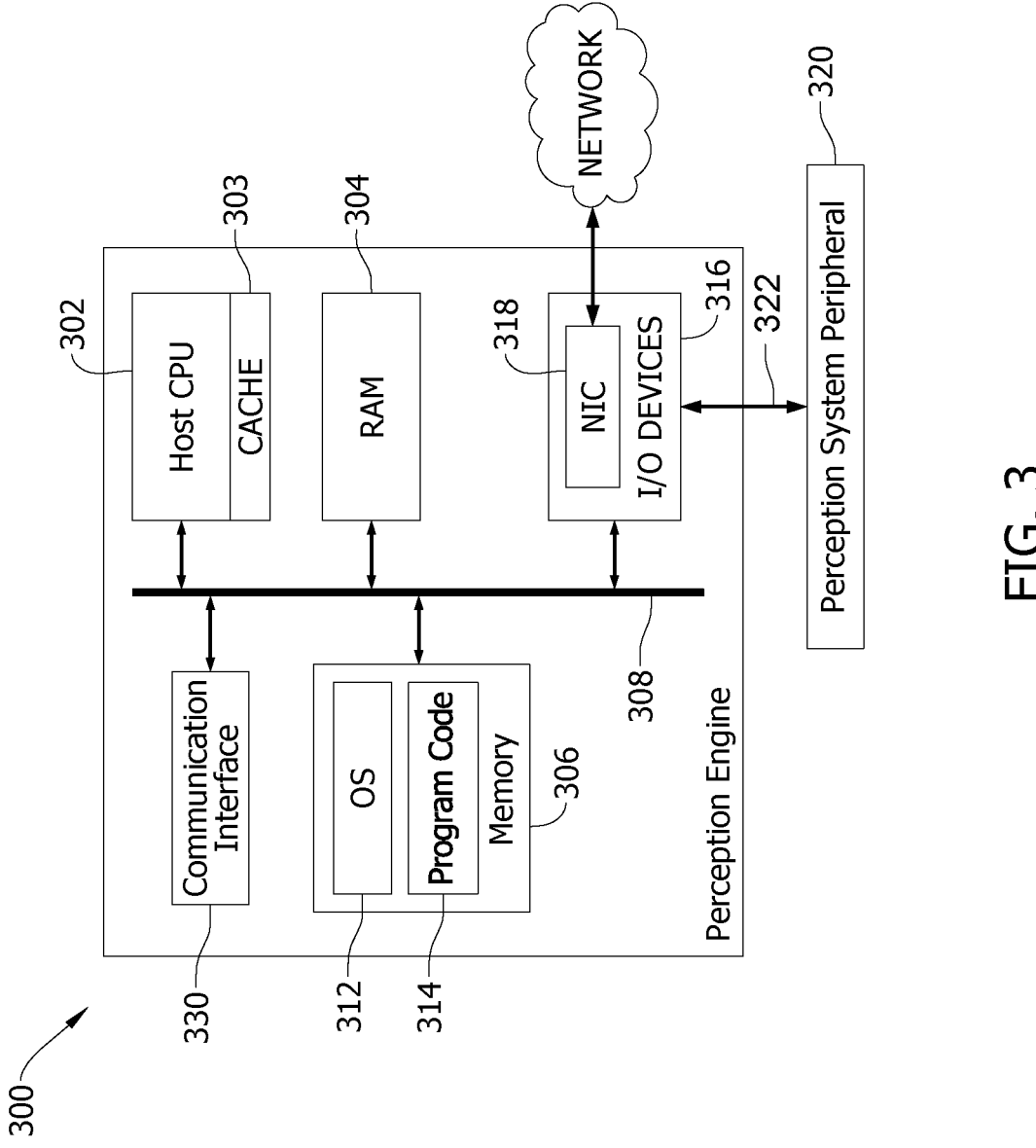
FIG. 3 is a block diagram of an example computing system at a hub.

FIG. 3 is a block diagram of an example computing system 300, such as an application server at a hub. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more section of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, one or more weight sensors, a keyboard, or a display device, etc.

Figure 4A:
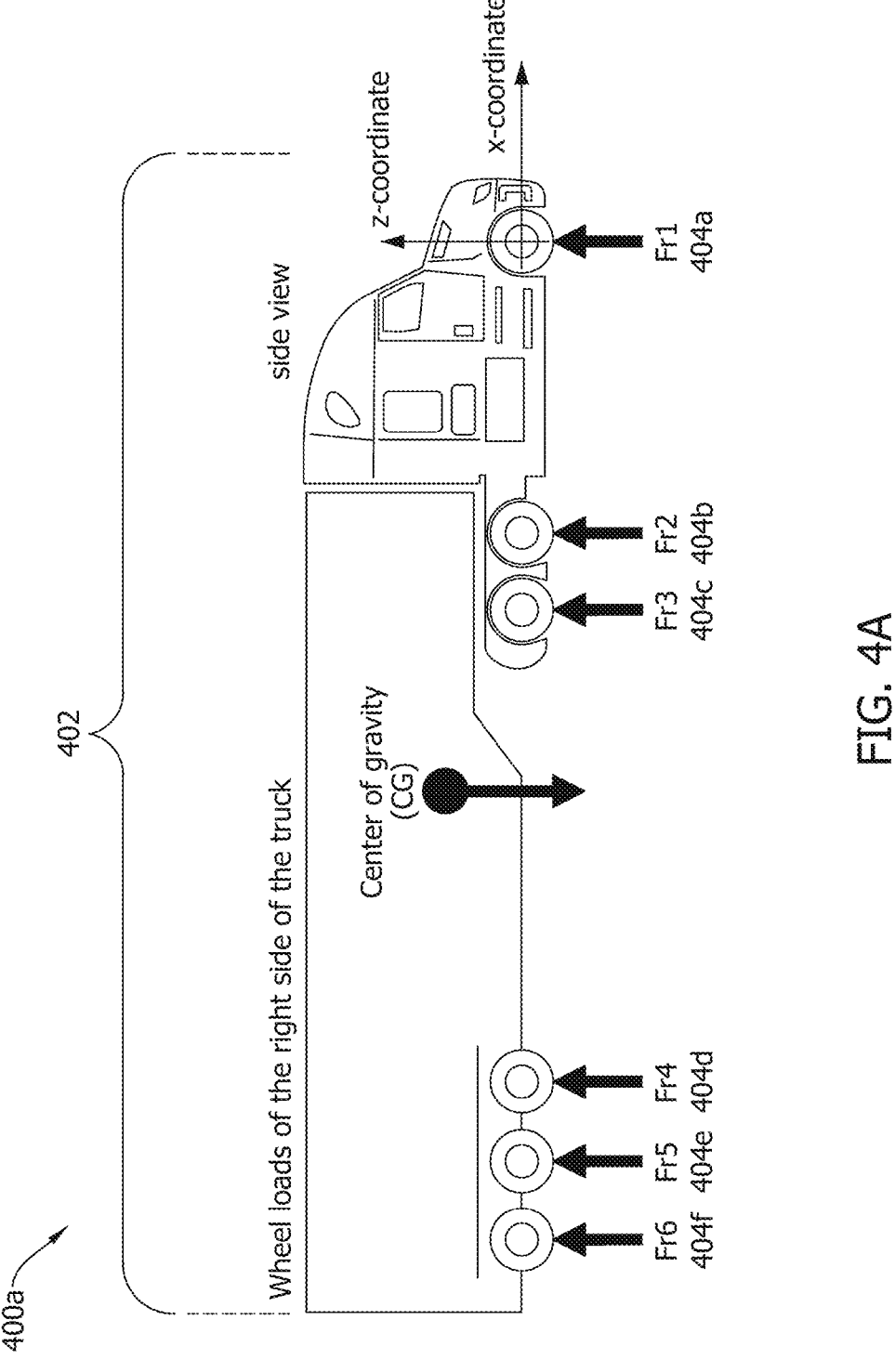
FIG. 4A is an illustration of a sideview of a truck.
Figure 4B:
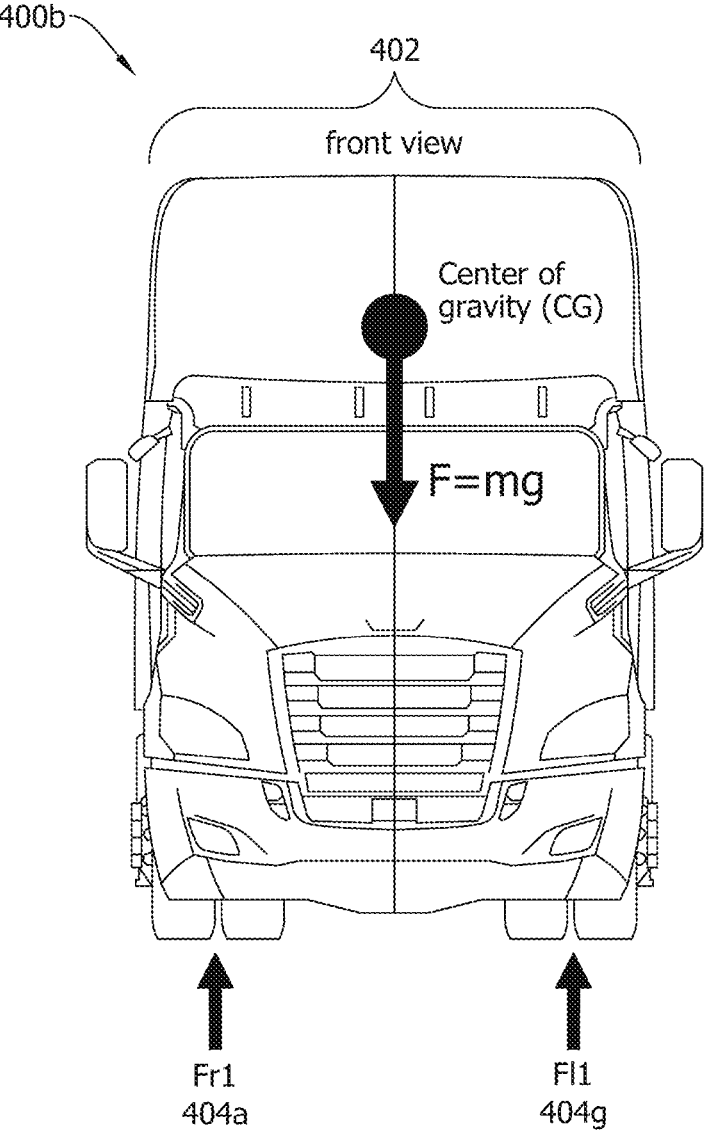
FIG. 4B is an illustration of a front view of the truck shown in FIG. 4A.

FIG. 4A is an illustration of a sideview 400a of a truck 402 (e.g., autonomous vehicle 100 connected with a trailer) and FIG. 4B is an illustration of a front view 400b of the truck 402. In some embodiments, a total mass m of the truck 402 and a center of gravity (CG) of the truck 402 may be measured using multiple weight sensors to measure force at multiple measurement points (e.g., at each wheel of the truck 402). For the truck 402, shown in FIG. 4A, there may be at least 12 different measurement points corresponding to wheels at positions 404a, 404b, 404c, 404d, 404e, and 404f on the right side of the truck 402 and wheels on the left side of truck 402 (not shown in FIG. 4A).

If force or weight applied at measurement points corresponding to wheel positions 404a-404f is $F_{r1}$, $F_{r2}$, $F_{r3}$, $F_{r4}$, $F_{r5}$, and $F_{r6}$, respectively, and force or weight applied at measurement corresponding wheel positions on the left side of the truck 402 is $F_1$, $F_{12}$, $F_{13}$, $F_{14}$, $F_{15}$, and $F_{16}$, respectively, then a total mass at the CG $F_{CG}$ of truck 402 may be determined as a sum of $F_{r1}$, $F_{r2}$, $F_{r3}$, $F_{r4}$, $F_{r5}$, $F_{r6}$, $F_{11}$ (shown in FIG. 4B as 404g), $F_{12}$, $F_{13}$, $F_{14}$, $F_{15}$, and $F_{16}$ such that:

$$F_{CG} = F_{r1} + F_{r2} + F_{r3} + F_{r4} + F_{r5} + F_{r6} + F_{11} + F_{12} + \qquad \text{Eq. 1}$$

$$F_{13} + F_{14} + F_{15} + F_{16} = m*g, \text{ where } g \text{ is a gravity constant}$$

Accordingly, the total mass m may be determined as:

$$m = (F_{r1} + F_{r2} + F_{r3} + F_{r4} + \qquad \text{Eq. 2}$$

$$F_{r5} + F_{r6} + F_{11} + F_{12} + F_{13} + F_{14} + F_{15} + F_{16})/g$$

As shown in FIG. 4A, a respective location of each wheel of the truck 402 along the X-axis (or a longitudinal axis or a longitudinal direction of the truck 402) and the Y-axis (or in a lateral direction or along a lateral axis of the truck 402) may be known from the specification of the truck 402, or may be measured by image processing of sensor data of multiple image sensors or cameras mounted or position at the hub. Accordingly, coordinates along the X-axis for the measurement points may be used to determine the center of gravity's coordinate along the X-axis by a momentum equilibrium around Y-axis as shown below.

$$F_{CG}x_{CG} = F_{r1}x_1 - F_{r2}x_2 - F_{r3}x_3 - F_{r4}x_4 - F_{r5}x_5 - \qquad \text{Eq. 3}$$

$$F_{r6}x_6 - F_{11}x_1 - F_{12}x_2 - F_{13}x_3 - F_{14}x_4 - F_{15}x_5 - F_{16}x_6 = 0$$

$$X_{CG} = (F_{r1}x_1 + F_{r2}x_2 + F_{r3}x_3 + F_{r4}x_4 + F_{r5}x_5 + \qquad \text{Eq. 4}$$

$$F_{r6}x_6 + F_{11}x_1 + F_{12}x_2 + F_{13}x_3 + F_{14}x_4 + F_{15}x_5 + F_{16}x_6)/F_{CG}$$

Similarly, coordinates along the Y-axis for the measurement points may be used to determine the center of gravity's coordinate along the Y-axis by a momentum equilibrium around X-axis as shown below.

$$F_{CG}y_{CG} = F_{r1}y_1 - F_{r2}y_2 - F_{r3}y_3 - F_{r4}y_4 - F_{r5}y_5 - \qquad \text{Eq. 5}$$

$$F_{r6}y_6 - F_{11}y_1 - F_{12}y_2 - F_{13}y_3 - F_{14}y_4 - F_{15}y_5 - F_{16}y_6 = 0$$

$$y_{CG} = (F_{r1}y_1 + F_{r2}y_2 + F_{r3}y_3 + F_{r4}y_4 + F_{r5}y_5 + \qquad \text{Eq. 6}$$

$$F_{r6}y_6 + F_{11}y_1 + F_{12}y_2 + F_{13}y_3 + F_{14}y_4 + F_{15}y_5 + F_{16}y_6)/F_{CG}$$

Figure 4C:
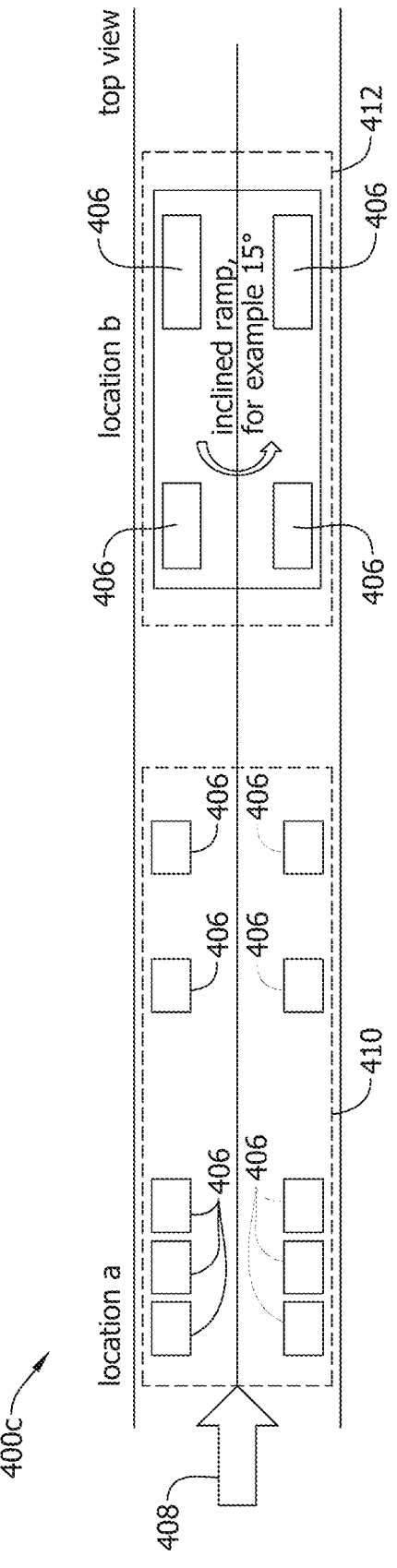
FIG. 4C is an illustration of example drive path at the hub to measure a total mass and coordinates of a center of gravity of the truck shown in FIG. 4A using multiple weight sensors.

In above Eq. 4 or Eq. 6, $F_{CG}$ may be calculated using Eq. 1 above. FIG. 4C illustrates an example top view 400c of an area (or a drive path) at the hub where multiple weight sensors 406s are positioned. As shown in FIG. 4C, the truck 402 is driven along a path 408 and the truck may stop on the path 408 such that its wheels are on the weight sensors 406s. The path 408 may have a first section 410 including a horizontally flat surface, and a second section 412 including a laterally sloped surface. The laterally sloped surface of the second section 412 may be inclined at a predetermined angle, such as 15°, as shown in FIG. 4C. A first set of plurality of weight sensors may be positioned on a ground or a horizontally flat surface of the driving path in the first section 410, and a second set of plurality of weight sensors may be positioned on the laterally sloped surface in the second section 412. The first set of plurality of weight sensors positioned on the ground or horizontally flat surface of the driving path in the first section 410, and the second set of plurality of weight sensors positioned on the laterally sloped surface in the second section 412 may be moveable (or arranged) according to positions of the wheels of the truck 402 with reference to the front axle of the truck 402.

The truck may drive along the path 408 and stop in the first section 410 such that each wheel of a plurality of wheels of the truck 402 may be on a weight sensor of the first set of plurality of weight sensors. Sensor data corresponding to each weight sensor of the first set of plurality of weight sensors may be received at the computing system shown in FIG. 3. Based on the sensor data corresponding to each weight sensor of the first set of plurality of weight sensors, a total mass of the truck 402 may be determined using Eq. 1 and Eq. 2 described herein. Additionally, or alternatively, coordinates of a center of gravity of the truck 402 along a longitudinal axis (X-axis) and a lateral axis (Y-axis) may be determined based on a weight measured at each weight sensor of the first set of plurality of weight sensors and coordinates of each weight sensor of the first set of plurality of weight sensors measured with respect to the front axle of the truck 402 according to Eq. 1 to Eq. 6 described herein.

The center of gravity's Z coordinate may be measured with the truck 402 driving to the second section 412 and stopping on the ramp in the second section 412. Sensor data corresponding to each weight sensor of the second set of plurality of weight sensors may be received at the computing system shown in FIG. 3. Based on the sensor data corresponding to each weight sensor of the second set of plurality of weight sensors, and, in particular, due to the sloped surface in the second section 412, the measured load corresponding to the truck's left side of wheels and load corresponding to the truck's right side of wheels may cause a shift in Y coordinate of the center of gravity. A change in Y coordinate of the center of gravity for the truck 402 on the flat surface in the first section 410 versus on the ramp in the second section 412 may be used to determine the Z coordinate (or a coordinate along the vertical axis) of the center of gravity, as described herein with reference to FIG. 4D.

Figure 4D:
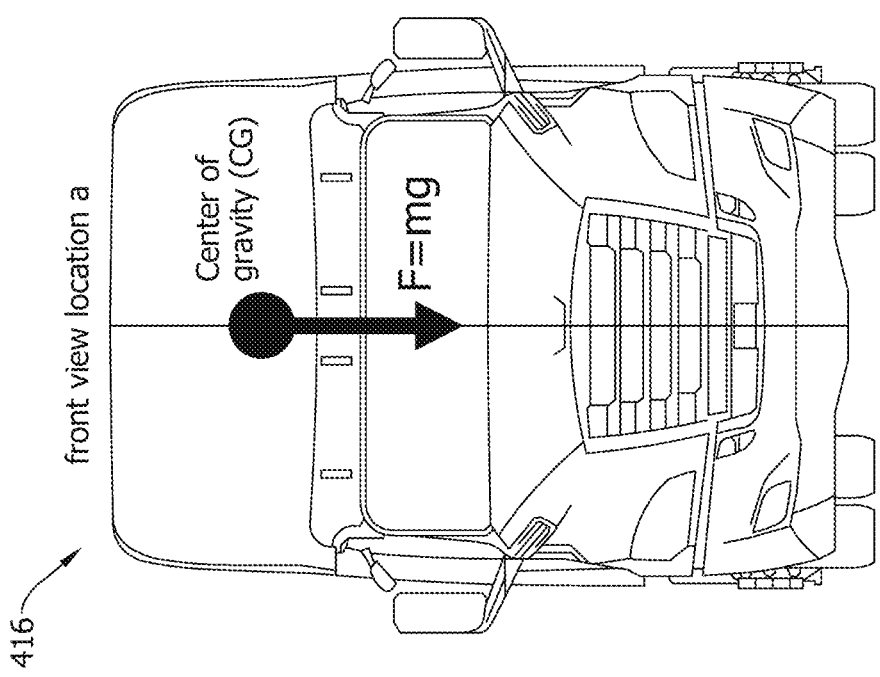
FIG. 4D illustrates a front view of the truck shown in FIG. 4A on a flat surface section and on a ramp section of the drive path at the hub.
Figure 4D:
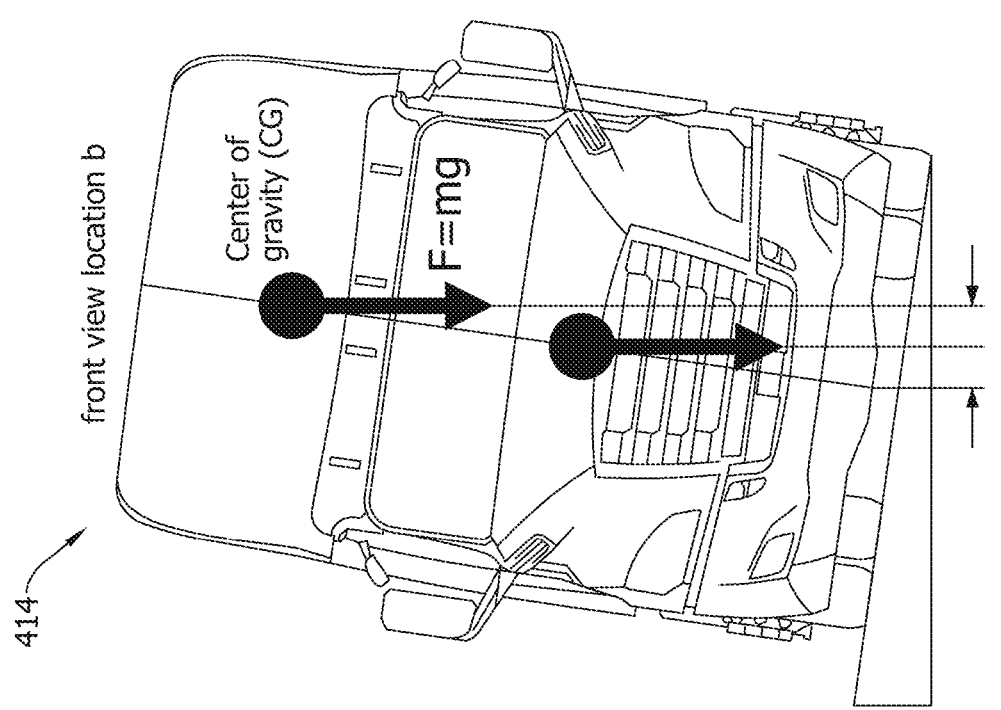

FIG. 4D illustrates a front view 414 of the truck 402 on a flat surface section and a front view 416 of the truck 402 on the ramp. As shown in FIG. 4D, an exemplary estimation of Y coordinate of the center of gravity on the flat surface in the first section 410 and on the ramp in the second section 412 provide two different values for Y coordinate. A delta between two Y coordinates Δy and an angle α corresponding to the inclined plane may be used to determine the Z coordinate of the center of gravity based on:

$$\tan\alpha = \frac{\Delta y_{CG}}{Z_{CG}};$$ <div align="right">Eq. 7</div>

$$Z_{CG} = \frac{\Delta y_{CG}}{\tan\alpha}$$ <div align="right">Eq. 8</div>

Measuring or identifying coordinates of the center of gravity of the truck 402 along X, Y, and Z axes thus increases accuracy of finite element method (FEM) modeling to reflect an elastic deformation of the truck 402 (including a trailer) on the inclined plane. The total mass and coordinates of the center of gravity along X, Y, and Z axes of the truck 402 may be communicated to the autonomy computing system 200 from the hub by the computing device 300 (shown in FIG. 3) for safe maneuvering of the truck 402 on the road.

In some embodiments, a total mass, and a center of gravity of a truck with trailer (loaded with goods or empty) may be determined using multiple image sensors such as cameras.

Figure 5A:
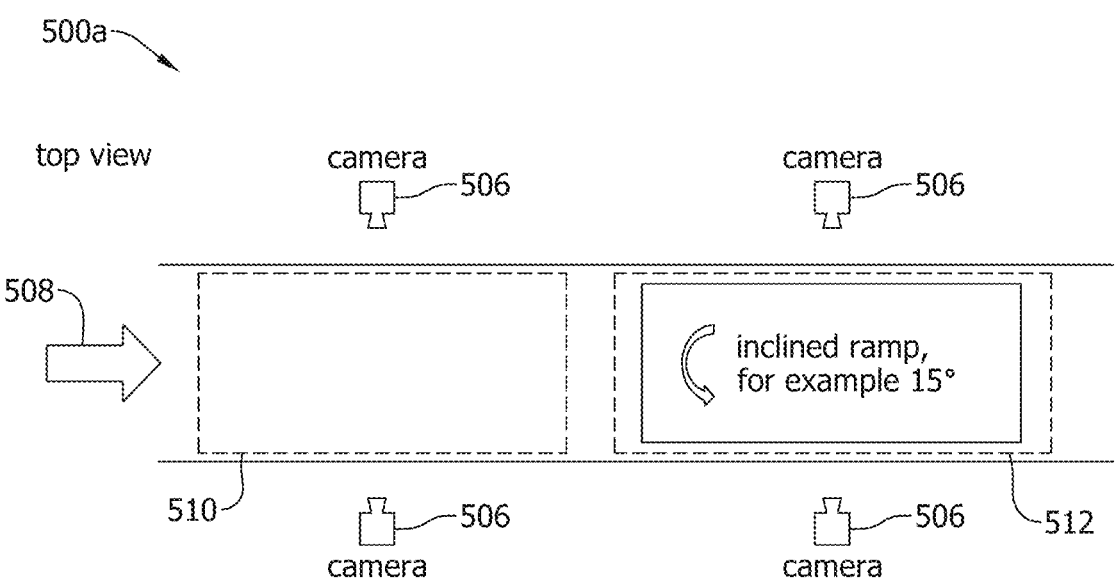
FIG. 5A is an illustration of example drive path at the hub to measure a total mass and coordinates of a center of gravity of the truck shown in FIG. 4A using multiple image sensors.

FIG. 5A illustrates an example top view 500a of an area (or a drive path) at the hub where multiple image sensors 506s are positioned. As shown in FIG. 5A, the truck 502 is driven along a path 508 and the truck may stop on the path 508 such that image data corresponding to wheels of the truck 502 may be collected using the multiple image sensors 506s. The path 508 may have a first section 510 including a horizontally flat surface, and a second section 512 including a laterally sloped surface. The laterally sloped surface of the second section 512 may be inclined at a predetermined angle, such as 15°, as shown in FIG. 5A. A first set of plurality of image sensors may be positioned in the first section 510, and a second set of plurality of image sensors may be positioned in the second section 512. The first set of plurality of image sensors, and the second set of plurality of image sensors in the second section may be moveable (or adjusted) according to positions of the wheels of the truck 502. Data from multiple image sensors 502s may be processed to determine a total mass or a center of gravity of the truck.

Figure 5B:
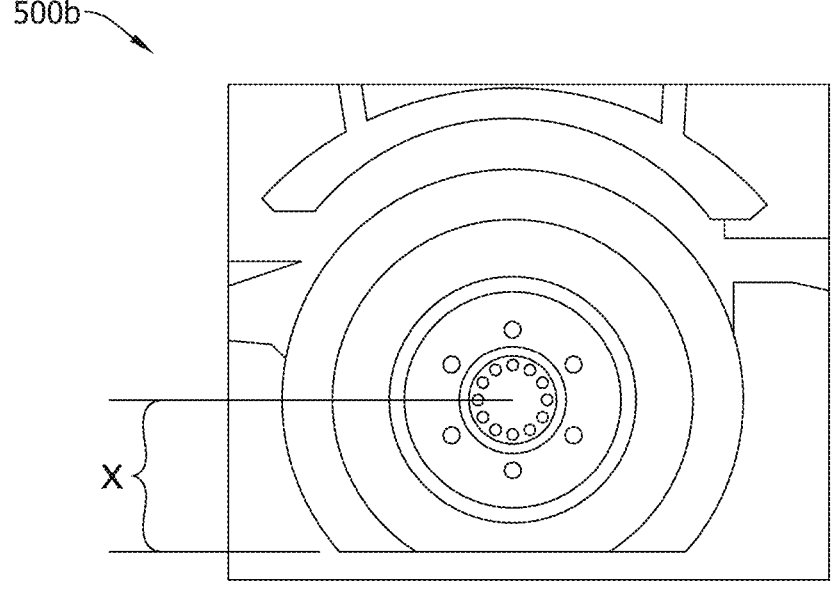
FIG. 5B illustrates an example view in which the weight load at each wheel causes a change in a distance between the wheel's center point and the wheel's touch point on a ground surface.

In some embodiments, stiffness of the truck tires may be used to measure weight load at each tire (a measurement point) of the truck. FIG. 5B illustrates an example view 500b in which the weight load at each wheel may cause a change in a distance between the wheel's center point and the wheel's touch point on a ground surface. The change in the distance between the wheel's center point and the wheel's touch point on the ground when the truck 502 is loaded versus when the truck is not loaded may be used to determine the weight load at the respective wheel (or measurement point) according $F=c*x$, where x corresponds with the change in the distance between the wheel's center point and the wheel's touch point on the ground, c corresponds with stiffness of a tire of the wheel, and F corresponds with force or weight at each wheel position such as $F_{r1}$, $F_{r2}$, $F_{r3}$, $F_{r4}$, $F_{r5}$, and $F_{r6}$, $F_{11}$, $F_{12}$, $F_{13}$, $F_{14}$, Fis, and $F_{16}$. Accordingly, Eq. 1 to Eq. 8 described herein may be used to determine the total mass and the center of gravity of the truck using multiple image sensors instead of the multiple weight sensors.

In some embodiments, a value of c corresponding to the stiffness of the tire may be received from a tire supplier or a tire manufacturer using an application programming interface (API). By way of a non-limiting example, the tire supplier or tire manufacturer may be identified using processing of image data, including a tire label, captured using one or more image sensor of the multiple image sensors 502s. The value of c depends on the tire pressure and ambient temperature. The tire pressure may be measured using a sensor of a tire pressure monitoring system located at each wheel and reporting tire pressure to the autonomy computing system 200 for further transmission to the hub. Ambient temperature may be measured using temperature sensors 218 and reported to the autonomy computing system 200 for further transmission to the hub. In some embodiments, temperature sensors 218 may measure temperature at each tire and report to the autonomy computing system 200 for further transmission to the hub.

Figure 5C:
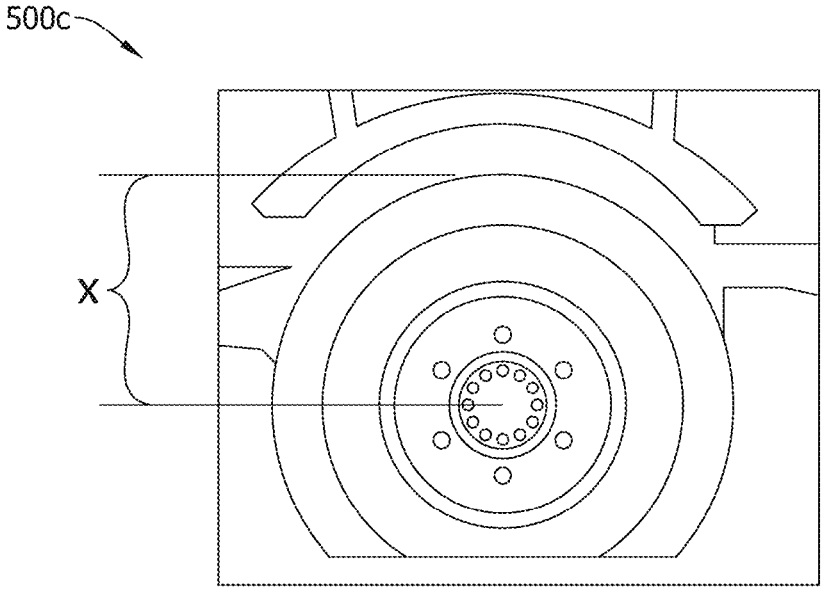
FIG. 5C illustrates an example view in which the weight load on a chassis spring causes a change in a distance between the wheel's center point and the chassis spring.

In some embodiments, stiffness of the truck chassis spring, e.g., an air spring, may be used to measure weight load at each tire (a measurement point) of the truck. FIG. 5C illustrates an example view 500c in which the weight load on the chassis spring causes a change in a distance between the wheel's center point and the chassis spring. The change in the distance between the wheel's center point and the chassis spring, when the truck is loaded versus when the truck is not loaded, may be used to determine the weight load at the respective wheel (or measurement point) according $F=c^*x$, where x corresponds with the change in the distance between the wheel's center point and the chassis spring, c corresponds with stiffness of the chassis spring and an axle mass, and F corresponds with force or weight at each wheel position such as $F_{r1}$, $F_{r2}$, $F_{r3}$, $F_{r4}$, $F_{r5}$, and $F_{r6}$, $F_1$, $F_{12}$, $F_{13}$, $F_{14}$, $F_{15}$, and $F_{16}$. Accordingly, Eq. 1 to Eq. 8 described herein may be used to determine the total mass and the center of gravity of the truck using multiple image sensors instead of the multiple weight sensors.

In some embodiments, a value of c corresponding to the stiffness of the chassis spring may be received from a tire supplier or a tire manufacturer using an application programming interface (API). By way of a non-limiting example, the tire supplier or tire manufacturer may be identified using processing of image data, including a tire label, captured using one or more image sensor of the multiple image sensors 502s. The value of c depends on the tire pressure and axle mass. The tire pressure may be measured using a sensor of a tire pressure monitoring system located at each wheel and reporting tire pressure to the autonomy computing system 200 for further transmission to the hub. Axle mass may be received from the supplier of the axle using an API.

Various functional operations of the embodiments described herein may be implemented using machine learning algorithms, and performed by one or more local or remote processors, transceivers, servers, and/or sensors, and/or via computer-executable instructions stored on non-transitory computer-readable media or medium.

In some embodiments, the machine learning algorithms may be implemented, such that a computer system "learns" to analyze, organize, and/or process data without being explicitly programmed. Machine learning may be implemented through machine learning methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of images with known characteristics or features or with a large sample of other data with known characteristics or features. Such information may include, for example, information associated with a plurality of images and/or other data of a plurality of different objects, items, or property.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text, or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

FIG. 6 illustrates an exemplary flow-chart 600 of method operations performed by a system using multiple weight sensors. The system includes at least one processor, at least one memory storing instructions, a driving path including a first section and a second section, and a first set of plurality of weight sensors and a second set of plurality of weight sensors. The first section includes a horizontally flat surface, and the second section includes a laterally sloped surface that is inclined at a predetermined angle, for example, 15°. The first set of plurality of weight sensors is positioned on the horizontally flat surface of the driving path in the first section and the second set of plurality of weight sensors is positioned on the laterally sloped surface in the second section. The at least one processor is configured to execute the instructions stored in the at least one memory to perform operations including determining 602 a total mass of a vehicle based on sensor data corresponding to each weight sensor of the first set of plurality of weight sensors. The sensor data is received upon the vehicle stopping in the first section with each wheel of a plurality of wheels of the vehicle on a weight sensor of the first set of plurality of weight sensors. The operations further include determining 604 a first coordinates of a center of gravity of the vehicle along a longitudinal axis and a lateral axis based on a weight measured at each weight sensor of the first set of plurality of weight sensors and coordinates of each weight sensor of the first set of plurality of weight sensors measured with respect to a front axle of the vehicle.

Additionally, a coordinate of the center of gravity along a vertical axis is also determined. Upon the vehicle stopping in the second section with each wheel of the plurality of wheels on a respective weight sensor of the second set of plurality of weight sensors, a second coordinates of the center of gravity of the vehicle is determined along the longitudinal axis and the lateral axis based on a weight measured at each weight sensor of the second set of plurality of weight sensors and coordinates of each weight sensor of the second set of plurality of weight sensors measured with respect to the front axle of the vehicle. Based on a change in the first coordinates of the center of gravity and the second coordinates of the center of gravity along the lateral axis, a coordinate of the center of gravity along a vertical axis may be determined as described herein. The determined total mass of the vehicle and the coordinates of the center of gravity of the vehicle along the longitudinal axis, the lateral axis, and the vertical axis may be transmitted to a computing device (e.g., autonomy computing system 200). Alternatively, the determined total mass of the vehicle and the coordinates of the center of gravity of the vehicle along the longitudinal axis and the lateral axis may be transmitted to the computing device.

In some embodiments, the first set of plurality of weight sensors positioned on the horizontally flat surface of the driving path in the first section or the second set of plurality of weight sensors positioned on the laterally sloped surface in the second section may be moveable according to positions of the plurality of wheels of the vehicle with reference to the front axle of the vehicle.

FIG. 7 illustrates an exemplary flow-chart 700 of method operations performed by a system using multiple image sensors. The system includes at least one processor, at least one memory storing instructions, a driving path including a first section and a second section, and a first set of plurality of image sensors and a second set of plurality of image sensors. The first section includes a horizontally flat surface, and the second section includes laterally sloped surface that is inclined at a predetermined angle, for example, 15°. The first set of plurality of image sensors is positioned in the first section and the second set of plurality of image sensors is positioned in the second section. The at least one processor is configured to execute the instructions stored in the at least one memory to perform operations including determining 702 a first distance between a center point of a wheel and a touch point on a ground surface of the first section based on first sensor data of the first set of plurality of image sensors. The first distance is determined for each wheel of a plurality of wheels of a vehicle while the vehicle is stopped in the first section and not loaded. The operations further include determining 704 a second distance between the center point and the touch point on the ground surface of the first section based on second sensor data of the first set of plurality of image sensors. The second distance is determined for each wheel of the plurality of wheels of the vehicle while the vehicle is stopped in the first section and loaded. The operations further include determining 706 a load at each wheel in the first section. The load at each wheel in the first section is determined based at least in part upon a difference between the first distance and the second distance and based at least in part upon characteristics of a respective tire of each wheel. The operations further include determining 708 a total mass of the vehicle and a first coordinates of a center of gravity of the vehicle along a longitudinal axis and a lateral axis with respect to a front axle of the vehicle. The total mass of the vehicle and the first coordinates of the center of gravity are determined based upon the load at each wheel in the first section.

Additionally, a coordinate of the center of gravity along a vertical axis is also determined. Upon the vehicle stopping in the second section, for each wheel of the plurality of wheels of the vehicle while the vehicle is stopped in the second section and not loaded, a third distance between the center point and the touch point on a ground surface of the second section may be determined based on first sensor data of the second set of plurality of image sensors. Further, for each wheel of the plurality of wheels of the vehicle while the vehicle is stopped in the second section and loaded, a fourth distance between the center point and the touch point on the ground surface of the second section may be determined based on second sensor data of the second set of plurality of image sensors. A load at each wheel in the second section may be determined based at least in part upon a difference between the third distance and the fourth distance and based at least in part upon the characteristics of the respective tire of each wheel. A second coordinates of the center of gravity of the vehicle may be determined along the longitudinal axis and the lateral axis based upon the load at each wheel in the second section. Based upon a change in the first coordinates of the center of gravity and the second coordinates of the center of gravity along the lateral axis, a coordinate of the center of gravity along a vertical axis may be determined.

The method operations may also include transmitting the determined total mass of the vehicle and the coordinates of the center of gravity of the vehicle along the longitudinal axis, the lateral axis, and the vertical axis to a computing device (e.g., autonomy computing system 200). Alternatively, the determined total mass of the vehicle and the coordinates of the center of gravity of the vehicle along the longitudinal axis and the lateral axis may be transmitted to the computing device. As described herein, the characteristics of a respective tire may include tire stiffness, which may be determined based upon a tire manufacturer or a tire label identified using the first sensor data or the second sensor data of the first set of plurality of image sensors. Additionally, or alternatively, the tire stiffness may be determined based upon air pressure for the tire. The tire stiffness may also be determined based upon ambient temperature or a temperature in proximity of the tire.

FIG. 8 is another exemplary flow-chart 800 of method operations performed by a system using multiple image sensors. The system includes at least one processor, at least one memory storing instructions, a driving path including a first section and a second section, and a first set of plurality of image sensors and a second set of plurality of image sensors. The first section includes a horizontally flat surface, and the second section includes a laterally sloped surface that is inclined at a predetermined angle, for example, 15°. The first set of plurality of image sensors is positioned in the first section and the second set of plurality of image sensors is positioned in the second section. The at least one processor is configured to execute the instructions stored in the at least one memory to perform operations including determining 802 a first distance between a center point of a wheel and a chassis spring of a vehicle based on first sensor data of the first set of plurality of image sensors. The first distance is determined for each wheel of a plurality of wheels of the vehicle while the vehicle is stopped on the horizontally flat surface in the first section and not loaded. The operations further include determining 804 a second distance between the center point and the chassis spring based on second sensor data of the first set of plurality of image sensors. The second distance is determined for each wheel of the plurality of wheels of the vehicle while the vehicle is stopped on the horizontally flat surface in the first section and loaded. The operations further include determining 806 a load at each wheel in the first section. The load at each wheel in the first section is determined based at least in part upon a difference between the first distance and the second distance and based at least in part upon characteristics of the chassis spring. The operations further include determining 808 a total mass of the vehicle and a first coordinates of a center of gravity of the vehicle along a longitudinal axis and a lateral axis with respect to a front axle of the vehicle. The total mass of the vehicle and the first coordinates of the center of gravity are determined based upon the load at each wheel in the first section.

Additionally, a coordinate of the center of gravity along a vertical axis is also determined. Upon the vehicle stopping in the second section, for each wheel of the plurality of wheels of the vehicle while the vehicle is stopped in the second section and not loaded, a third distance between the center point and the chassis spring may be determined based on first sensor data of the second set of plurality of image sensors. Further, for each wheel of the plurality of wheels of the vehicle while the vehicle is stopped in the second section and loaded, a fourth distance between the center point and the chassis spring may be determined based on second sensor data of the second set of plurality of image sensors. A load at each wheel in the second section may be determined based at least in part upon a difference between the third distance and the fourth distance and based at least in part upon the characteristics of the chassis spring. A second coordinates of the center of gravity of the vehicle may be determined along the longitudinal axis and the lateral axis based upon the load at each wheel in the second section. Based upon a change in the first coordinates of the center of gravity and the second coordinates of the center of gravity along the lateral axis, a coordinate of the center of gravity along a vertical axis may be determined.

The method operations may also include transmitting the determined total mass of the vehicle and the coordinates of the center of gravity of the vehicle along the longitudinal axis, the lateral axis, and the vertical axis to a computing device (e.g., autonomy computing system 200). Alternatively, the determined total mass of the vehicle and the coordinates of the center of gravity of the vehicle along the longitudinal axis and the lateral axis may be transmitted to the computing device. As described herein, the characteristics of the chassis spring may include chassis spring stiffness. By way of a non-limiting example, the chassis spring may be an air spring.

An example technical effect of the methods, systems, and apparatus described herein includes at least estimation of a total mass and coordinates of a center of gravity at the hub using one or more image sensors or one or more weight sensors.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system, comprising:
a first set of plurality of image sensors positioned in a first section of a driving path of a hub; and
at least one processor configured to execute instructions stored in at least one memory to perform operations comprising:
for each wheel of a plurality of wheels of a vehicle while the vehicle is stopped in the first section and not loaded, determining a first distance between a center point of a wheel and a chassis spring of the vehicle based on first sensor data of the first set of plurality of image sensors;
for each wheel of the plurality of wheels of the vehicle while the vehicle is stopped in the first section and loaded, determining a second distance between the center point and the chassis spring based on second sensor data of the first set of plurality of image sensors;
based at least in part upon a difference between the first distance and the second distance, and based at least in part upon characteristics of the chassis spring, determining a load at each wheel in the first section; and
based upon the load at each wheel in the first section, determining a total mass of the vehicle and first coordinates of a center of gravity of the vehicle along a longitudinal axis and a lateral axis with respect to a front axle of the vehicle,
wherein an autonomy computing system of the vehicle is configured to control operation of the vehicle, based on the determined total mass of the vehicle and the determined first coordinates of the center of gravity of the vehicle.

2. The system of claim 1, wherein the driving path further includes a second section, the second section includes a laterally sloped surface and a second set of plurality of image sensors positioned in the second section of the driving path, and wherein the at least one processor is further configured to perform the operations comprising:
for each wheel of the plurality of wheels of the vehicle while the vehicle is stopped in the second section and not loaded, determining a third distance between the center point and the chassis spring based on first sensor data of the second set of plurality of image sensors;
for each wheel of the plurality of wheels of the vehicle while the vehicle is stopped in the second section and loaded, determining a fourth distance between the center point and the chassis spring based on second sensor data of the second set of plurality of image sensors;
based at least in part upon a difference between the third distance and the fourth distance, and based at least in part upon the characteristics of the chassis spring, determining a load at each wheel in the second section;
based upon the load at each wheel in the second section, determining second coordinates of the center of gravity of the vehicle along the longitudinal axis and the lateral axis; and
based upon a change in the first coordinates of the center of gravity and the second coordinates of the center of gravity along the lateral axis, determining a coordinate of the center of gravity along a vertical axis.

3. The system of claim 2, wherein the laterally sloped surface is inclined at a predetermined angle.

4. The system of claim 3, wherein the predetermined angle is 15°.

5. The system of claim 2, wherein the at least one processor is further configured to perform the operations comprising transmitting, to a computing device of the vehicle, the determined total mass of the vehicle, the first coordinates of the center of gravity of the vehicle along the longitudinal axis and the lateral axis, and the determined coordinate of the center of gravity along the vertical axis.

6. The system of claim 1, wherein the at least one processor is further configured to perform the operations comprising transmitting, to a computing device of the vehicle, the determined total mass of the vehicle and the first coordinates of the center of gravity of the vehicle along the longitudinal axis and the lateral axis.

7. The system of claim 1, wherein the characteristics of the chassis spring include chassis spring stiffness.

8. The system of claim 7, wherein the chassis spring is an air spring.

9. A computer-implemented method, comprising:

for each wheel of a plurality of wheels of a vehicle while the vehicle is stopped in a first section of a driving path of a hub on a surface of the first section and not loaded, determining a first distance between a center point of a wheel and a chassis spring of the vehicle based on first sensor data of a first set of plurality of image sensors positioned in the first section;

for each wheel of the plurality of wheels of the vehicle while the vehicle is stopped in the first section on the surface and loaded, determining a second distance between the center point and the chassis spring based on second sensor data of the first set of plurality of image sensors;

based at least in part upon a difference between the first distance and the second distance, and based at least in part upon characteristics of the chassis spring, determining a load at each wheel in the first section; and based upon the load at each wheel in the first section, determining a total mass of the vehicle and first coordinates of a center of gravity of the vehicle along a longitudinal axis and a lateral axis with respect to a front axle of the vehicle, wherein an autonomy computing system of the vehicle is configured to control operation of the vehicle, based on the determined total mass of the vehicle and the determined first coordinates of the center of gravity of the vehicle.

10. The computer-implemented method of claim 9, further comprising:

for each wheel of the plurality of wheels of the vehicle while the vehicle is stopped in a second section of the driving path and not loaded, determining a third distance between the center point and the chassis spring based on first sensor data of a second set of plurality of image sensors positioned in the second section of the driving path that includes a laterally sloped surface;

for each wheel of the plurality of wheels of the vehicle while the vehicle is stopped in the second section and loaded, determining a fourth distance between the center point and the chassis spring based on second sensor data of the second set of plurality of image sensors;

based at least in part upon a difference between the third distance and the fourth distance, and based at least in part upon the characteristics of the chassis spring, determining a load at each wheel in the second section;

based upon the load at each wheel in the second section, determining second coordinates of the center of gravity of the vehicle along the longitudinal axis and the lateral axis; and based upon a change in the first coordinates of the center of gravity and the second coordinates of the center of gravity along the lateral axis, determining a coordinate of the center of gravity along a vertical axis.

11. The computer-implemented method of claim 10, wherein the laterally sloped surface is inclined at a predetermined angle.

12. The computer-implemented method of claim 11, wherein the predetermined angle is 15°.

13. The computer-implemented method of claim 10, further comprising transmitting, to a computing device of the vehicle, the determined total mass of the vehicle, the first coordinates of the center of gravity of the vehicle along the longitudinal axis and the lateral axis, and the determined coordinate of the center of gravity along the vertical axis.

14. The computer-implemented method of claim 9, further comprising transmitting, to a computing device of the vehicle, the determined total mass of the vehicle and the first coordinates of the center of gravity of the vehicle along the longitudinal axis and the lateral axis.

15. The computer-implemented method of claim 9, wherein the characteristics of the chassis spring include chassis spring stiffness.

16. The computer-implemented method of claim 15, wherein the chassis spring is an air spring.

17. At least one non-transitory computer-readable medium (CRM) storing instructions, which, when executed by at least one processor of a system, cause the at least one processor to perform operations comprising:

for each wheel of a plurality of wheels of a vehicle while the vehicle is stopped in a first section of a driving path of a hub on a surface of the first section and not loaded, determining a first distance between a center point of a wheel and a chassis spring of the vehicle based on first sensor data of a first set of plurality of image sensors positioned in the first section;

for each wheel of the plurality of wheels of the vehicle while the vehicle is stopped in the first section on the surface and loaded, determining a second distance between the center point and the chassis spring based on second sensor data of the first set of plurality of image sensors;

based at least in part upon a difference between the first distance and the second distance, and based at least in part upon characteristics of the chassis spring, determining a load at each wheel in the first section; and based upon the load at each wheel in the first section, determining a total mass of the vehicle and first coordinates of a center of gravity of the vehicle along a longitudinal axis and a lateral axis with respect to a front axle of the vehicle, wherein an autonomy computing system of the vehicle is configured to control operation of the vehicle, based on the determined total mass of the vehicle and the determined first coordinates of the center of gravity of the vehicle.

18. The at least one non-transitory CRM of claim 17, wherein the instructions further cause the at least one processor to perform the operations further comprising:

for each wheel of the plurality of wheels of the vehicle while the vehicle is stopped in a second section of the driving path and not loaded, determining a third distance between the center point and the chassis spring based on first sensor data of a second set of plurality of image sensors positioned in the second section of the driving path that includes a laterally sloped surface;

for each wheel of the plurality of wheels of the vehicle while the vehicle is stopped in the second section and loaded, determining a fourth distance between the center point and the chassis spring based on second sensor data of the second set of plurality of image sensors;

based at least in part upon a difference between the third distance and the fourth distance, and based at least in part upon the characteristics of the chassis spring, determining a load at each wheel in the second section;

based upon the load at each wheel in the second section, determining second coordinates of the center of gravity of the vehicle along the longitudinal axis and the lateral axis; and based upon a change in the first coordinates of the center of gravity and the second coordinates of the center of gravity along the lateral axis, determining a coordinate of the center of gravity along a vertical axis.

19. The at least one non-transitory CRM of claim 18, wherein the laterally sloped surface is inclined at a predetermined angle of 15°.

20. The at least one non-transitory CRM of claim 18, wherein the instructions further cause the at least one processor to perform the operations further comprising transmitting, to a computing device of the vehicle, the determined total mass of the vehicle, the first coordinates of the center of gravity of the vehicle along the longitudinal axis and the lateral axis, and the determined coordinate of the center of gravity along the vertical axis.

\* \* \* \* \*